(No Model.)
P. P. KILCULLEN.
DEVICE FOR TURNING FLY WHEELS OF ENGINES, &c.
No. 279,652. Patented June 19, 1883.
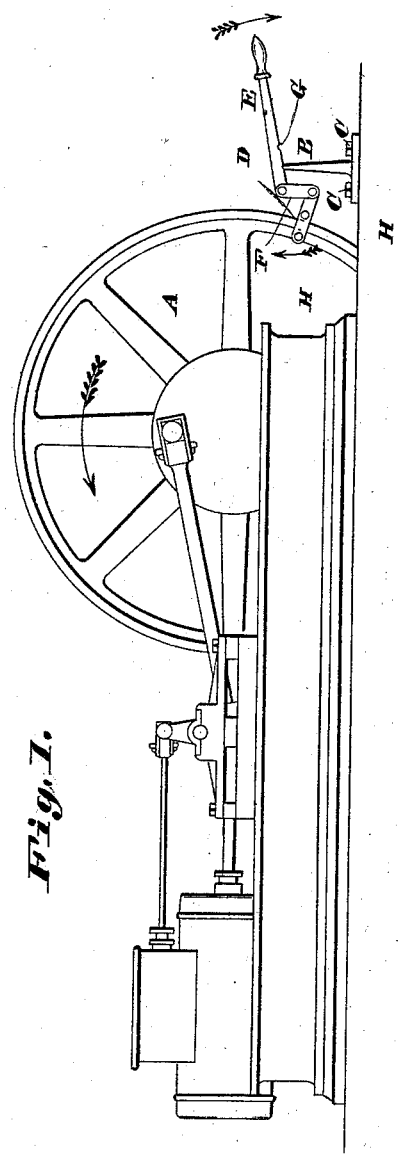
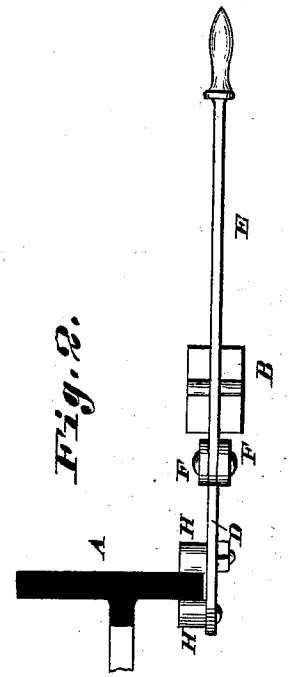
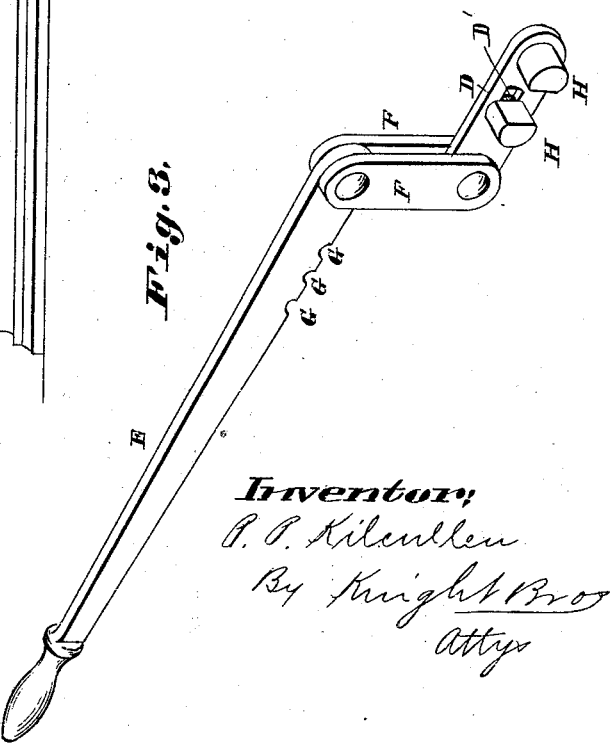
Attest:
Charles Pickles
Wm J. Danner
Inventor,
P. P. Kilcullen
By Knight Bros
Attys

UNITED STATES PATENT OFFICE.

PATRICK P. KILCULLEN, OF ST. LOUIS, MISSOURI.

DEVICE FOR TURNING FLY-WHEELS OF ENGINES, &c.

SPECIFICATION forming part of Letters Patent No. 279,652, dated June 19, 1883.

Application filed May 7, 1883. (No model.)

*To all whom it may concern:*

Be it known that I, PATRICK P. KILCULLEN, of the city of St. Louis, in the State of Missouri, have invented a certain new and useful Improvement in Devices for Turning Fly-Wheels of Engines, Large Pulleys, &c., of which the following is a full, clear, and exact description, reference being had to the accompanying drawings, forming part of this specification, and in which—

Figure 1 is a side elevation; Fig. 2, a perspective view, and Fig. 3 a top view.

My invention relates to a device for turning fly-wheels of engines to start the engine, large pulleys, wheels, and like objects; and my invention consists in points of novelty hereinafter fully described, and pointed out in the claims.

Referring to the drawings, A represents the fly-wheel of an engine.

B represents a fulcrum, which may be secured in place near the fly-wheel by means of bolts C. (See Fig. 1.)

D represents a bar connected to the end of a lever, E, by a link or links, F, as shown. The lever preferably has notches G to receive the upper edge of the fulcrum to keep the lever from slipping while being used. Projecting from the bar D are two pins, H H, the necessary distance apart to receive the rim of the wheel or pulley. Thus when it is desired to assist the steam in starting an engine, as to get the machinery off a "dead-center," the bar is made to engage the fly-wheel, as shown in Figs. 1 and 2, and the lever placed on the fulcrum and power applied to its outer end. When the wheel has turned slightly, and it is desired to take another hold lower down on the rim, all that is necessary to be done is to raise the outer end of the lever, and the bar, being pivoted to the lever by the link or links, will fall, the pins remaining in engagement with the rim of the wheel. When the wheel is started and the steam needs no further assistance, the device can be disengaged from the wheel by simply turning the lever over on its fulcrum, which will rock the bar, disengaging the pins from the rim.

One of the pins H may be secured to the bar D by its neck passing through a slot, D', in the bar, and having a nut on its end. (See Fig. 2.) This pin can thus be adjusted to compensate for wear and for differences in the thickness of rims.

The movement of the parts is illustrated by arrows in Fig. 1. As the lever pulls up on the outer end of the bar it of course binds the pins on the rim, so that they will not slip thereon, but take a secure hold.

I claim as my invention—

1. In a device for starting fly-wheels of engines, &c., the combination of fulcrum, lever, and bar, the bar being connected to the lever by a suitable link or links, and having pins to engage the rim of the wheel, substantially as shown and described, for the purpose set forth.

2. In a device for starting fly-wheels of engines, &c., the combination of a fulcrum secured near the wheels by bolts, the lever having notches to receive the fulcrum, connecting link or links, and the bar having pins projecting therefrom to engage the rim of the wheel, substantially as shown and described, for the purpose set forth.

3. In a device for starting fly-wheels of engines, &c., the combination of fulcrum, lever, and bar, the bar being connected to the lever by a suitable link or links, and having pins to engage the rim of the wheel, one of which is adjustable, substantially as shown and described, for the purpose set forth.

PATRICK P. KILCULLEN.

In presence of—
SAML. KNIGHT,
GEO. H. KNIGHT.